(12) United States Patent
Even et al.

(10) Patent No.: US 7,145,273 B2
(45) Date of Patent: Dec. 5, 2006

(54) MOTOR VEHICLE ALTERNATOR

(75) Inventors: Denis Even, Paris (FR); Pierre Faverolle, Paris (FR); Jean-Claude Mipo, Créteil (FR); Jean-Luc Tarrago, Bonneuil/S/Marne (FR)

(73) Assignee: Valeo Equipments Electriques Monteur, Creteil (FR)

( * ) Notice: Subject to any disclaimer, the term of this patent is extended or adjusted under 35 U.S.C. 154(b) by 0 days.

(21) Appl. No.: 10/204,565

(22) PCT Filed: Dec. 21, 2001

(86) PCT No.: PCT/FR01/04148

§ 371 (c)(1),
(2), (4) Date: Aug. 21, 2002

(87) PCT Pub. No.: WO02/50977

PCT Pub. Date: Jun. 27, 2002

(65) Prior Publication Data

US 2003/0117033 A1    Jun. 26, 2003

(30) Foreign Application Priority Data

Dec. 21, 2000  (FR) ................................. 00 16738
Apr. 5, 2001   (FR) ................................. 01 04770
Oct. 19, 2001  (FR) ................................. 01 13553

(51) Int. Cl.
    *H02K 3/50*    (2006.01)
(52) U.S. Cl. .................... 310/71; 310/71; 310/254; 310/180; 310/201; 310/260
(58) Field of Classification Search ................. 310/201, 310/180, 254, 194, 260, 71
See application file for complete search history.

(56) References Cited

U.S. PATENT DOCUMENTS 3,984,712 A * 10/1976 Hill .............................. 310/71
5,239,743 A *  8/1993 Santandrea ................... 310/71
5,508,571 A *  4/1996 Shafer, Jr. .................... 310/179
5,945,759 A     8/1999 Tanaka et al. ................. 310/90

(Continued)

FOREIGN PATENT DOCUMENTS

DE       40 31 276 A1    4/1992

(Continued)

OTHER PUBLICATIONS

French Search Report, Aug. 23, 2001.

*Primary Examiner*—Karl Tamai
*Assistant Examiner*—Yahveh Comas
(74) *Attorney, Agent, or Firm*—Morgan & Finnegan, LLP

(57) ABSTRACT

The invention relates to an alternator for a motor vehicle including a stator (13) equipped with a body (14) carrying several phases each comprising, on the one hand, an inlet (E1 to E'3) and an outlet (S1 to S'3) installed outside the body (14) of the stator (13), and, on the other hand, electrically conducting elements, which are arranged in a network on either side of the body (14) of the stator (13) so as to form a first (12) and a second (12') bun and which pass through the said body, in which the electrically conducting elements are linked together to form the said networks and connect the inlet of the phase to the outlet of the phase by forming at least one winding. According to the invention, one of the buns (12, 12'), on one side of the body (14) of the stator (13), carries three inlets (E1 to E3–E'1 to E'3), an electrically conducting linking part (50, 51) linking the said inlets electrically together.

46 Claims, 6 Drawing Sheets

U.S. PATENT DOCUMENTS

| | | | |
|---|---|---|---|
| 6,198,190 B1 * | 3/2001 | Umeda et al. | 310/179 |
| 6,204,586 B1 * | 3/2001 | Umeda et al. | 310/180 |
| 6,288,462 B1 * | 9/2001 | Tanaka et al. | 310/254 |
| 6,470,984 B1 * | 10/2002 | Nakajima et al. | 310/218 |
| 6,624,544 B1 * | 9/2003 | Higashino et al. | 310/180 |
| 6,700,236 B1 * | 3/2004 | Umeda et al. | 310/54 |
| 6,703,749 B1 * | 3/2004 | Kuroyanagi | 310/180 |

FOREIGN PATENT DOCUMENTS

| | | |
|---|---|---|
| EP | 0 420 371 A1 | 4/1991 |
| EP | 0 881 752 A1 | 12/1998 |
| JP | 63265536 A * | 11/1988 |

* cited by examiner

MOTOR VEHICLE ALTERNATOR

FIELD OF THE INVENTION

The present invention relates to alternators of motor vehicles.

STATE OF THE ART

As is known, an alternator for a motor vehicle includes a stator equipped with a body carrying several phases each comprising, on the one hand, an inlet and an outlet installed outside the body of the stator, and, on the other hand, electrically conducting elements, which are arranged in a network on either side of the body of the stator so as to form a first and a second bun and which pass through the said body. The electrically conducting elements are linked together to form the said networks and connect the inlet of the phase to the outlet of the phase by forming at least one winding.

Such a machine is described, for example, in the document WO 92/06527.

In one conventional embodiment, the inlets of the phase windings are connected in a star or y, the outlets of the phases are linked to a rectification and/or control device for rectifying the alternating current induced into a direct current, while the inlets are linked to a neutral point.

OBJECT OF THE INVENTION

The object of the present invention is to create this neutral point in a simple and economical manner.

According to the invention, an alternator of the type set out above is characterised in that one of the buns, on one side of the stator, carries three inlets, on the one hand, and, on the other hand, an electrically conducting linking part of circumferential orientation linking the said inlets electrically together.

By virtue of the invention, the inlets are simplified since they do not have to be extended in order to be linked to a common neutral point; this link being formed in a simple and economical manner by the linking part installed in the vicinity of the body of the stator. The neutral point, by virtue of the linking part, is integrated in a compact manner to the stator.

The phase inlets are advantageously standardised and shorter, which makes it possible to reduce the electrical resistance.

The linking part allows an increase in the electrical power of the alternator.

The linking part is a lightweight matching piece or a segment of a piece, which is carried by one of the buns. This part, of circumferential orientation, is not very bulky, has a size which depends on the applications and makes it possible to render the stator more compact. It promotes a reduction in the electrical resistance of the stator and standardisation of the outlets.

The linking part is fixed by any appropriate means onto the inlets.

It is possible, for example, to envisage electrically conducting fixings by crimping or bonding.

Advantageously, the linking part is linked by welding to at least one of the said to the [sic] inlets.

The linking part, in one embodiment, features an annular-sector shape, being fixed onto the inlets. Thus a comb is formed with the inlets.

For preference, the linking part has an annular-sector shape mounted at the outer periphery of the bun carrying the said inlets and the width of which is oriented axially.

The linking part thus consists, in one embodiment, of a simple bar. This bar is advantageously pierced in order to facilitate its extension and the ventilation of its carrying bun, especially when the bar is of axial orientation.

This arrangement makes it possible to reduce the bulk of the stator, since it is possible to fix the linking part onto the inner or outer periphery of the inlets.

For preference, the linking part is installed axially between the vertices of the electrically conducting elements consisting of the axial ends of these elements belonging to the bun in question, and the body of the stator.

For example, the linking part is installed axially at the vertices of the electrically conducting elements consisting of the axial ends of these elements belonging to the bun in question.

Advantageously, the linking part is a linking piece linking the inlets.

For preference, the inlets each comprise a free part of axial orientation, the linking piece linking these free parts.

Advantageously, the inlets each comprise a free part of circumferential orientation, the linking piece linking these free parts.

For example, two inlets are linked by a pin, the linking part consisting of an end portion of the third inlet curved over in the circumferential direction and being welded onto the said pin.

For preference, the said two inlets linked by the said pin are consecutive, when following the periphery of the bun.

Advantageously, the said two inlets formed by the said pin are not consecutive when following the periphery of the bun, the said third inlet being linked to the said pin by a peripheral end portion.

For example, the linking part is extended by a free portion of axial orientation.

For preference, the linking part constitutes a circumferential extension of one of the three inlets.

For example, the other two inlets are linked to the linking part in each case by a circumferential end portion.

In order to reduce the bulk as much as possible, the inlets and the linking part are installed on a circumference of different diameter, for example greater, than that on which the three outlets associated with the inlets are installed.

In a variant, the inlets and the outlets are installed on the same circumference.

Advantageously, the outlets belong to the same bun as the inlets and extend in axial projection with respect to the inlets equipped with the linking part, this in the opposite direction to the body of the stator.

The windings of electrically conducting elements may be of the type with separate coils or with overlapping coils, of the undulating and/or imbricated type. Advantageously, the windings are of the type with bars in order to obtain buns of short length, facilitate the fixing of the linking part and obtain heavy currents at low voltages. The bars are advantageously overall of rectangular cross-section in order to increase the cross-section of electrically conducting elements and facilitate the fixing of the linking part on the inlets.

For example, the electrically conducting elements, the inlets and the outlets are in the form of bars.

Advantageously, the electrically conducting elements, the inlets and the outlets are in the form of bars of square or rectangular cross-section.

The stator with a linking part according to the invention is fitted in all types of alternator.

The alternator may include more than three phases.

For example, the alternator, in one embodiment, is of the six-phase type.

All combinations are then possible. In one embodiment, the six phase windings have inlets connected to a neutral point as described, for example, in the document FR-A-1 541 530. In this case, the linking part links together the six inlets. In a variant, two series of three phases linked to two rectification devices are provided, as described, for example, in the documents FR-A-2 687 861. The alternator is then equipped either with two linking parts when each series of three phases includes a neutral point, or with one linking part when one of the series of three phases includes a neutral point and the other series of three phases includes windings mounted in delta mode.

Each phase, in one embodiment, includes at least two windings as described, for example, in the documents EP-A-0 762 603 and WO 92/06527.

Advantageously, the linking part is produced on the basis of an electrically conducting element.

The inlets and the linking part, in one embodiment, are installed on one side of the body and the outlets on the other side of the said body.

Advantageously, in order to simplify the windings, the inlets, the outlets and the linking part, in another embodiment, are installed on the same side of the body of the stator.

DESCRIPTION OF THE DRAWINGS

The description which will follow illustrates the invention in the light of the attached drawings, in which.

DESCRIPTION OF PREFERRED EMBODIMENTS OF THE INVENTION

In the figures, identical or similar elements will be allocated the same reference signs.

Figure 1:
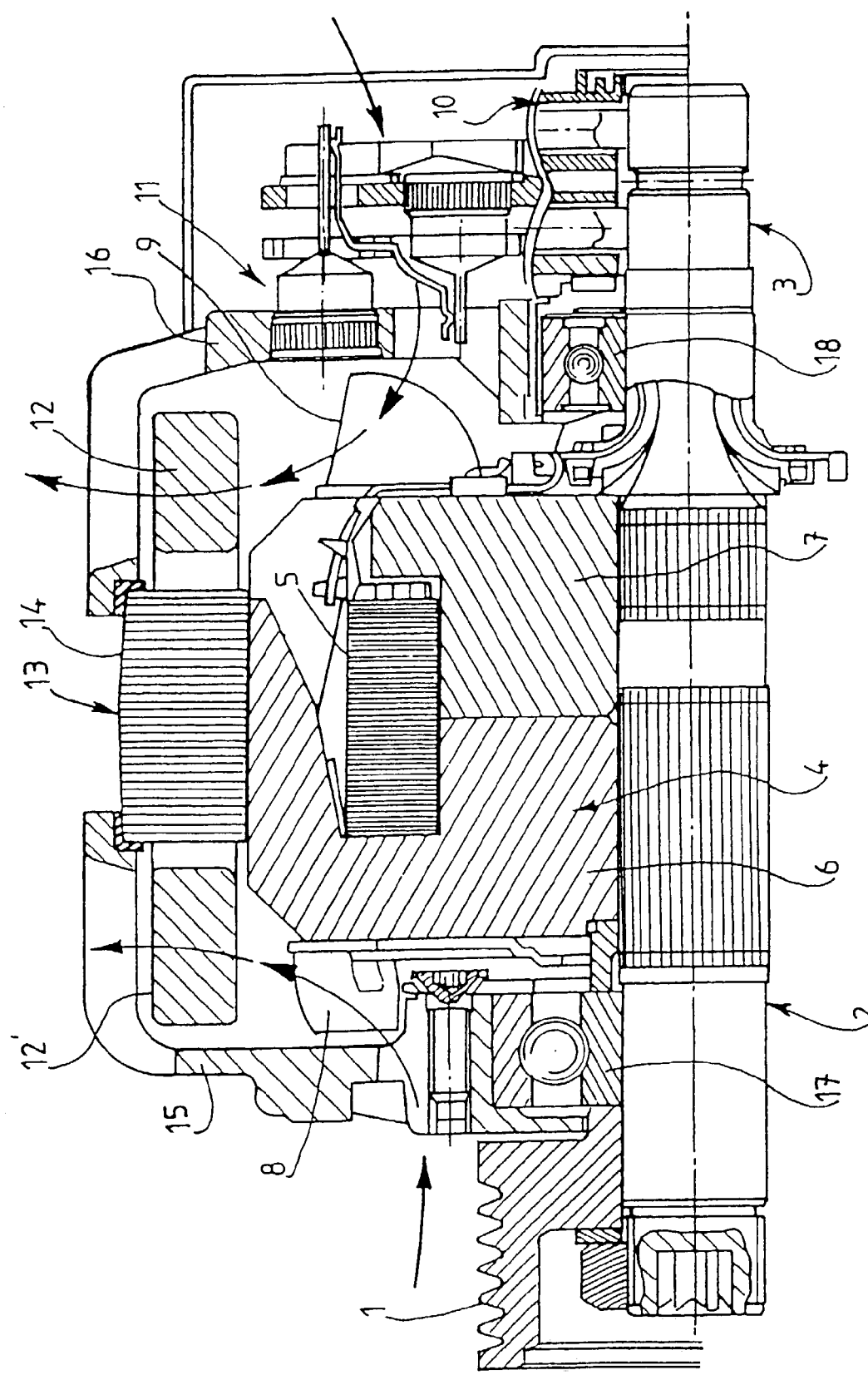
FIG. 1 is a half-view in axial section of an alternator with diagrammatic representation of the stator equipped with a linking piece according to the invention.

FIG. 1 represents a multi-phase rotating electric machine in the form of a compact alternator with internal ventilation of the three-phase type for a motor vehicle with an internal-combustion engine.

The alternator, going from left to right of FIG. 1, that is to say from front to rear, includes a drive pulley 1 integral, here by way of a nut, with the front end of a shaft 2, the rear end of which carries collector rings (not referenced) belonging to a collector 3. The axis of the shaft 2 constitutes the axis of rotation of the machine.

Centrally, the shaft 2 carries the rotor 4, fixed on and equipped with an excitation coil 5, the ends of which are linked by wire links to the collector 3. The rotor 4 here is a claw-type rotor, and therefore includes two, front and rear, pole wheels 6, 7 each respectively carrying a front 8 and rear 9 fan for, in a given axial bulk, augmentation of the power of the alternator and reduction of the noise from it. Each wheel 6, 7 is fixed onto the shaft 2 provided with knurled portions for that purpose, as can be seen in FIG. 1. Each wheel includes a flange perpendicular to the axis of the shaft 2. The excitation coil 5 is installed axially between the two wheels 6, 7. At the outer periphery of the flanges teeth are formed, from the same material, extending axially. The teeth have a trapezoidal shape and are given chamfers laterally. The teeth of one of the wheels are turned towards the other wheel, being offset in angle with respect to the teeth of this other wheel. There is therefore imbrication of the teeth in such a way that, in one embodiment variant, permanent magnets are interposed between the teeth in order further to augment the power of the machine. For example, profiled grooves are formed in the lateral edges of the teeth in order to hold the permanent magnets, as described in the document FR-A-2 748 248. When the winding 5 is activated, the rotor 4 is magnetised and it is [sic] thus defines pairs of magnetic poles, each pole wheel then including P/2 North poles and P/2 South poles respectively. For further details, refer to the document EP-A-0 515 259; the teeth of the pole wheels each laterally featuring at least one anti-noise chamfer, in the region of the area where they are rooted to the flange of the pole wheel in question, in order further to reduce noise, especially magnetic noise, from the alternator. Advantageously, each tooth, with respect to an axial axis of symmetry, features two anti-noise chamfers. The alternator is therefore less noisy.

The fans 8, 9 include a first series of blades or vanes, which form ventilation channels between them. Advantageously, two series of blades of different length are provided, as described in the document FR-A-2 811 156. Hence at least one blade of the second series of blades is interposed between two consecutive longer blades of the first series of blades. This arrangement makes it possible to reduce the noise from the alternator while enhancing the ventilation of it. The blades arise by cutting-out and folding of a flange fixed, for example by welding or any other means such as crimping, onto the pole wheel 6, 7 in question. As mentioned above, each wheel features axial teeth directed towards the other wheel, with the teeth of one wheel being imbricated into the other in order to form magnetic poles when the coil 5 is activated by virtue of the collector rings of the collector 3, each in contact with a brush (not referenced) carried by a brush holder 10 also serving as support for a voltage regulator (not visible) linked electrically to the brushes in order to regulate the voltage of the coil 5.

The regulator is linked to a current-rectifying device 11, such as a diode bridge (two diodes of which can be seen in FIG. 1), itself linked to the outlets of the phases equipped with windings, which the stator 13 of the alternator includes. The bridge here is of the same type as that described in the document EP-A-0 743 738, to which reference should be made for further details. This bridge therefore includes a positive heat sink on which are mounted the positive diodes, a negative heat sink, on which are mounted the negative diodes, and a connector. Here, the negative heat sink consists of the flange of the rear bearing 16 of the alternator described below. In a variant, the bridge is of the same type as that described in the document FR 01 09 482 filed on Jul. 16, 2001. In this case, the positive heat sink includes cooling vanes, which extend in the radial direction of the alternator; the negative diodes carried by the rear bearing being cooled by convection and conduction. This type of bridge is very suitable for the high-power alternator according to the invention. The armature-forming stator 13 surrounds the rotor 4 and features a body 14 fitted internally with axial slots 39, 39' for the passage of the wires or of the pins which the windings include. In a known way, the body 14 here consists of a pack of metal plates each exhibiting slots. These oblong-shaped slots constitute grooves when the metal plates are aligned and open out at the inner periphery of the body 14. The body 14 surrounds the rotor 4 with a radial gap being present between the inner periphery of the body 14 and the outer periphery of the rotor 4.

The windings are arranged in a network in order to form buns 12, 12' at their ends, extending, on the one hand, in axial projection on either side of the body 14; and, on the other hand, radially above the fans 8, 9.

These fans 8, 9 extend in the vicinity respectively of a front bearing 15 and of a rear bearing 16. The bearings 15, 16 are made of metal, here being aluminium based. These bearings, in a known way, include claws for fixing the alternator onto a fixed part of the motor vehicle and for electrical linking of the alternator to earth. The bearings 15, 16 are pierced for internal ventilation of the alternator by way of the fans 8, 9 when the fans 8, 9—rotor 4—shaft 2 assembly is driven in rotation by the pulley 1 linked to the engine of the motor vehicle via a transmission device including at least one belt in engagement with the pulley 1. This ventilation makes it possible to cool the windings of the buns 12, 12' and the coil 5, as well as the brush holder 10 with its voltage regulator and the rectification device 11. The path followed by the cooling fluid, here air, through the various apertures of the bearings 15, 16 and the interior of the machine have been represented by arrows in FIG. 1.

This device 11, the brush holder, as well as a pierced protective cap (not referenced) preferably made of plastic are carried, fixed on, by the rear bearing 16 such that the rear fan 9 is more powerful than the front fan 8. In a known way, the bearings 15, 16 are linked together, here with the aid of screws or, in a variant, of tie rods which are not visible, so as to form a casing or support intended to be mounted on a fixed part of the vehicle. This support carries the body 14.

The bearings 15, 16 each centrally carry a ball bearing 17, 18 for rotational support of the front and rear ends of the shaft 2 passing through the bearings in order to carry the pulley 1 and the rings of the collector 3.

The blades of the fans 8, 9 extend radially above the housings which the bearings 15, 16 feature for mounting of the bearings 17 and 18 which are thus ventilated. In a variant, the alternator is cooled by a cooling liquid, such as the cooling water from the internal-combustion engine of the motor vehicle; the rear bearing including channels as described, for example, in the document DE-A-100 19 914 to which reference may be made for further details. The stator in this case is mounted with the use of buffers made of elastic material, for example of elastomer, on the casing in order to filter the vibration and reduce noise. The same goes for FIG. 1, the buffers with a bracket-shaped cross-section not being referenced.

These buffers act between the free ends of the peripheral part of the bearings, of axial orientation, and the opposite axial ends of the body 14. These buffers constitute elastic damping means with radial and axial action for mechanical decoupling of the body 14 of the stator with respect to the casing consisting of the bearings 15, 16. The bearings also each include a transverse flange centrally carrying the ball bearing 17, 18 in question and being connected to the peripheral part in question. In a variant, the elastic damping means act in the region of the slots 39, 39' between the edges thereof and the electrically conducting elements, described below, mounted in them as described in the document FR 99 16369 filed on Dec. 23, 1999 and published under No FR-A-2 803 126. In a variant, elastically deformable thermally conducting resin is interposed radially between the outer periphery of the body 14 and the inner periphery of one of the bearings, such as the front bearing, as described in the document FR 00 13527 filed on Oct. 6, 2000. In this case, the coil 5 of the rotor 4 may be constructed on the basis of a conductor element wound and coated with a linking layer, for example of the thermosetting type, as described in the document FR-A-2 809 546. The coil 5 gives off more heat which is removed via the thermally conducting resin. In a variant, the body 14 is mounted directly on the bearings.

In a variant, the rotor includes salient poles as described in the document FR 01 00122 filed on Jan. 5, 2001; permanent magnets being accommodated in housings formed in the pack of metal plates which the rotor includes. These housings are open towards the outer periphery of the rotor and closed axially by non-magnetic pieces intended to come into abutment against the magnets.

Figure 2:
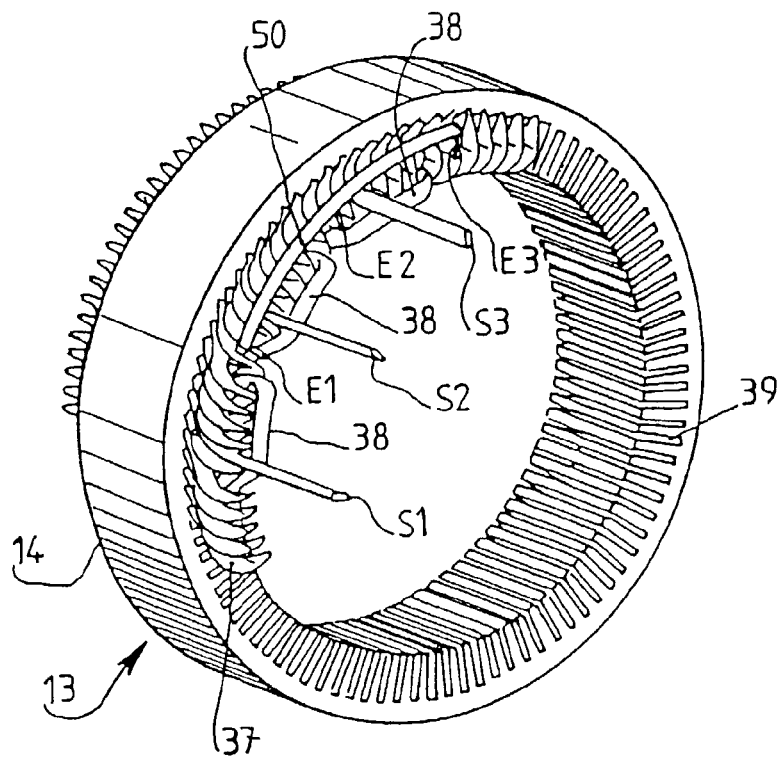
FIG. 2 is a view in perspective of the stator of FIG. 1 with removal of electrically conducting elements in order to show the slots of the stator.
Figure 3:
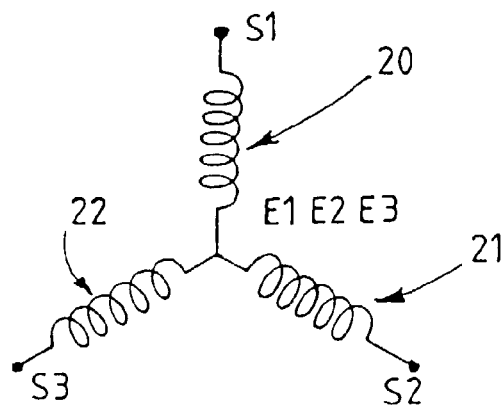
FIG. 3 is a diagrammatic view of the wiring of the windings of the phases.
Figure 4:
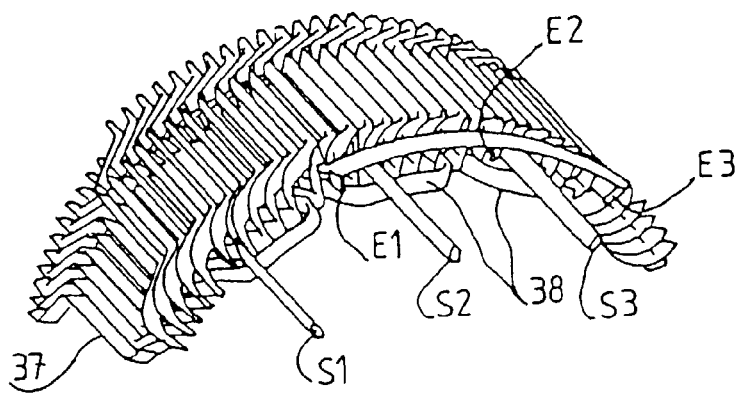
FIG. 4 is a view in perspective of the electrically conducting elements of FIG. 1.

In FIGS. 2 to 4, the alternator is of the three-phase type and includes three phases 20 to 22 with, in each case, respectively an inlet E1 to E3 and an outlet S1 to S3. The outlets, in a known way, are connected to the rectification device 11 for the electric current, knowing that the phases of the stator 13 produce an alternating current when the rotor is excited and is driven in rotation by the engine of the vehicle via the pulley 1. For that reason, it is necessary to rectify the alternating current in order to supply direct current to the electrical consumer units of the vehicle and to recharge its battery.

Figure 5:
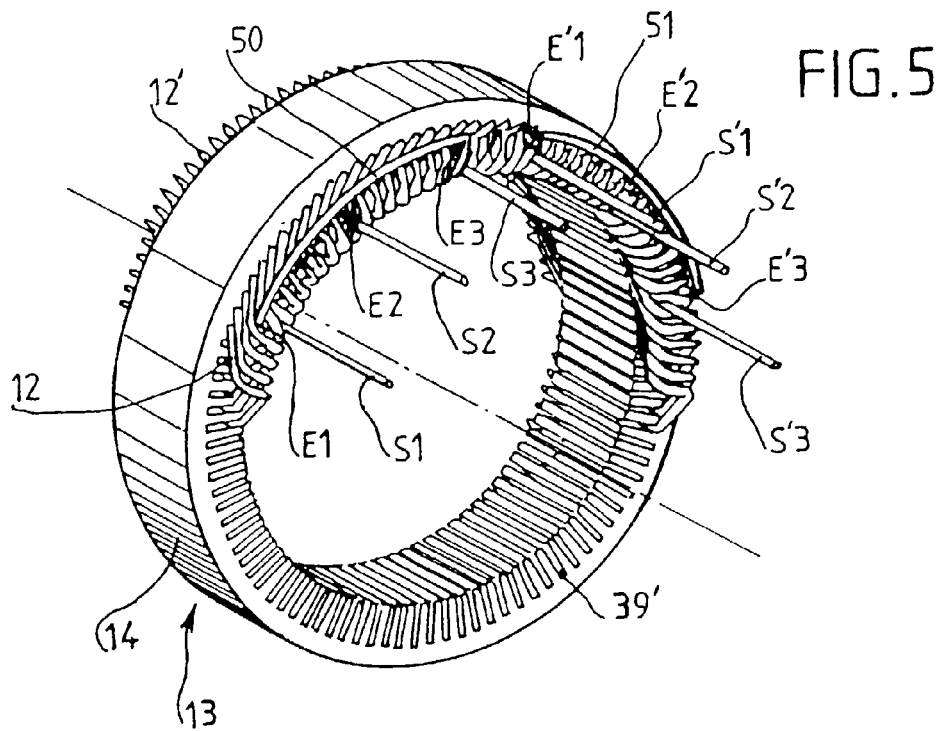
FIGS. 5 to 7 are views similar to FIGS. 2 to 4 for a second embodiment example according to the invention.
Figure 6:
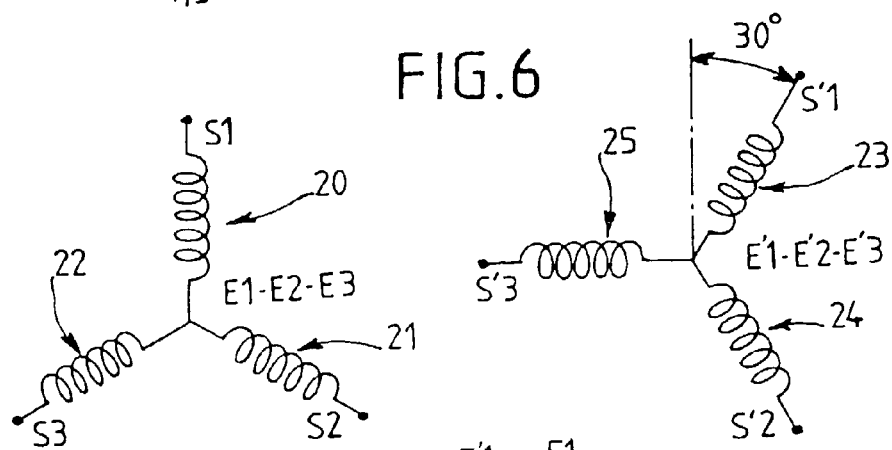
Figure 7:
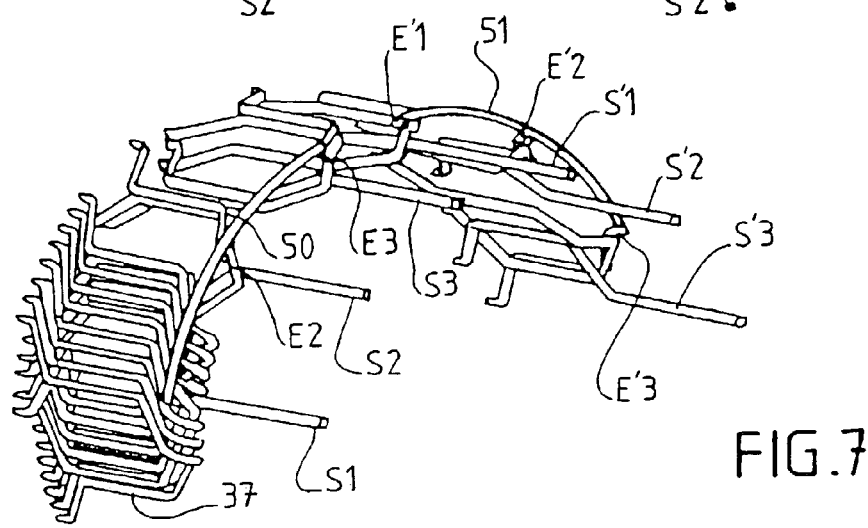

In FIGS. 5 to 7, the alternator is of the six-phase type and therefore includes, in addition to the phases 20 to 22 constituting a first series of three phases, a second series of three phases 23 to 25 with, in each case, respectively an inlet E'1 to E'3 and an outlet S'1 to S'3. The outlets are linked, in the above-mentioned way, to the rectification device 11, as described, for example, in the above-mentioned document EP-A-0 743 738; the connector of the device 11 including claws for fixing the outlets belonging to a network of electrically conducting regions. The fixing of the outlets to the claws is achieved, for example, by crimping or welding. Each phase includes at least one winding comprising electrically conducting elements 37, 38.

In all cases, the inlets are linked to a neutral point and the alternator for a motor vehicle includes a stator 13 equipped with a body 14, carrying several phases 20 to 25 each comprising, on the one hand, an input E1 to E'3 and an outlet S1 to S'3 installed outside the body 14 of the stator 13, and, on the other hand, electrically conducting elements 37, 38 which are arranged into a network on either side of the body 14 of the stator 13 so as to form a first 12 and a second 12' bun and which pass through the said body. The electrically conducting elements 37, 38 are linked together so as to form the said networks and to connect the inlet of the phase to the outlet of the phase, forming at least one winding. These conductor elements here are in the shape of bars. The bars here have a rectangular-shaped cross-section and advantageously belong to pins. The conductor elements here are fitted in pairs in the radial direction into the slots; the length of the bars being parallel to the lateral edges of the slots.

In order to reduce the length of the inlets and to constitute the neutral point according to the invention, an alternator of the type set out above is characterised in that one of the buns, on one side of the body 14 of the stator 13, carries three inlets E1 to E3–E'1 to E'3, an electrically conducting linking part 50 of circumferential orientation linking together the said inlets E1 to E3 and another 51 the inlets E'1 to E'3. Each linking part is formed by an affixed linking piece or by connected portions of pins.

The linking part, here of metal, for example of copper, thus makes it possible to form the neutral point in a compact, simple and economic way. This part is light and makes it possible to reduce the weight of the stator. The linking part makes it possible to standardise the inlets E1 to E3–E'1 to E'3, here of the same length and of identical cross-section. The linking part advantageously has the same cross-section as that of the inlets.

Here the inlets and the outlets of the phases have cross-sections identical to those of the electrically conducting elements, especially for economic reasons.

The linking part 50, 51 is generally linked by welding to the said inlets.

The linking part 50, 51, according to one characteristic, has an annular-sector shape so as to reduce the bulk and the electrical resistance of the stator 13.

This sector features a length in a circumferentially oriented circular arc, a weight and a height. Here the height or thickness is less than the width.

The annular sector constituting the linking part 50, 51 features a width of axial orientation so as to reduce the diametral bulk of the stator as much as possible and to avoid any interference with the outer periphery, of axial orientation, of the support 15, 16 of the alternator. In a variant, the width is oriented radially. In the embodiment represented in FIGS. 2 to 11 this linking part therefore consists of an independent piece in the shape of a curved bar.

This linking piece 50, 51 is covered with a layer of electrically insulating material and is bared in the region of the inlets E1 to E3–E'1 to E'3 in order to be welded to them. The piece 50, 51 is enamelled, for example.

As can be seen for example in FIG. 2, the inlets are welded over the width of the piece 50, 51.

More precisely, [lacuna] the inlets having a rectangular cross-section, it is the width of the inlets which is welded to the width of the piece 50, 51, that is to say on the flat.

The inlets E1 to E3 of FIGS. 2 to 4 are installed over a circumference of the same diameter as that over which the outlets S1 to S3 are installed, with a slight clearance being present between the linking piece and the two outlets S2, S3 which are surrounded by the piece 50; the other outlet S1 is offset circumferentially with respect to the piece 50.

In FIGS. 5 to 7, the inlets E'1 to E'3 and the linking piece 50, 51 are installed on a circumference of different diameter from that on which the outlets S'1 to S3, associated with the said inlets, are installed.

The inlets E'1 to E'3 and the linking piece 50, 51 are installed on a circumference of greater diameter to that on which the outlets S'1 to S'3, associated with the said inlets, are installed.

This arrangement facilitates the connecting of the outlets S'1 to S'3 with the rectification device 11 since the outputs are radially closer to the device 11. Furthermore, the fitting of the linking piece 50, 51 and its fixing onto the inlets are simpler and quicker.

Needless to say, it is possible to invert the structures in such a way that, in a variant, the inlets E1 to E3–E'1 to E'3 and the linking piece 50, 51 are installed over a circumference of smaller diameter to that on which the outlets S1 to S3–S'1 to S'3, associated with the said inlets, are installed.

The outlets S1 to S3–S'1 to S'3 belong to the same bun 12, 12' as the inlets E1 to E3–E'1 to E'3 and extend in axial projection with respect to the inlets E1 to E3–E'1 to E'3 equipped with the linking piece 50, 51, this in a direction opposite to the body 14 of the stator 13.

In embodiments represented, the outlets are installed at the rear of the stator 13 and are configured, in a known way, to pass through the rear bearing 16 so as to be connected to the diode-type rectification device 11. The length of the outlets therefore depends on the position of the device 11.

Needless to say, in a variant, the outlets S1 to S3–S'1 to S'3 do not belong to the same bun 12, 12' as the inlets E1 to E3–E'1 to E'3. In all cases, the outlets extend in axial projection with respect to the bun in question.

Here the buns 12, 12' are axially of the same axial length, especially because of the presence of the fan 9. In a variant, one of the buns is axially longer than the other.

The linking piece may be adjacent to the vertices of the electrically conducting elements 37, 38, which here are electrically insulated with respect to one another and with respect to the pack of metal plates, which the stator 13 features, in a known way, in order to form the body 14. To that end, these elements 37, 38 as well as the inlets E1 to E3–E'1 to E'3 and the outlets S1 to S3–S'1 to S'3 are covered over with a layer of an electrically insulating material. These constituent parts are enamelled, for example.

The position of the linking piece may vary. The linking piece 50, 51 may be installed axially between the vertices of the electrically conducting elements 37, 38, consisting of the axial ends of these elements 37, 38 belonging to the bun 12, 12' in question and the body 14 of the stator 13. The linking piece is therefore installed axially between the vertices of the bun and the body 14.

This is made possible because the linking piece is installed at one of the inner or outer peripheries of the bun in question. In the figures, the linking piece is installed at the outer periphery of the bun 12 thus partially surrounded by this piece in order to impede the ventilation of this bun as little as possible. In a variant, this piece is installed at the inner periphery of the bun.

The electrically conducting elements 37, 38, the inlets and the outlets are in the form of metal bars of rectangular cross-section and the body 14 of the stator 13, in the above-mentioned way, features a pack of metal plates complete with slots 39, 39' traversed by the electrically conducting elements 37, 38.

The conducting elements 37, in the above-mentioned way, are bars of rectangular cross-section section, here shaped into U-shapes and therefore feature branches mounted by axial threading into the slots 39, 39' and a bottom connecting the branches to the outside of the body 14. The ends of the branches are linked together by welding outside the body 14. The spacing between two slots 39, 39' containing the branches intended to be welded to one another corresponding to one magnetic-pole pitch between a North pole and a South pole of the rotor 4.

The bottoms of the U-shapes are twisted such that one of the branches of the U, called upper branch, is mounted in the bottom of a slot while the other branch, called lower branch, is mounted in the region of the opening-out part of a succeeding slot of the same phase. The conductor elements 37 are therefore mounted in lower and upper layers in the slots, while being electrically insulated from each other. The electrically conducting elements 37 are mounted in series between the inlets and the outlets in question so as to constitute at least one winding per phase.

The windings of the phases are of the undulating type here, such that, in a known way, the windings of the phases are offset circumferentially with respect to one another.

The welded ends of the branches and the bottoms of the U-shapes of the electrically conducting elements 37, here in the form of pins, are therefore arranged in a network on either side of the body 14 of the stator 13 so as to form the first bun 12' and the second bun 12. The bun 12, situated at the rear of the alternator, includes the inlets and the outlets for the phases as well as the bottoms of the U-shapes forming the heads of the pins 37 constituting the electrically conducting elements. The bun 12' includes the welded ends of the pins 37 passing axially through the body 14. This arrangement facilitates manufacture of the stator 13.

In a variant, the pins 37 are in two parts such that the welds exist in the region of the heads of the pins 37 and of the bun 12.

Needless to say, the pins and therefore the bars may be of round or square cross-section. In any event, by virtue of the bars, the buns 12, 12' are of short length.

In FIGS. 2 to 7, the rotor 4 features pole wheels each equipped with eight teeth which corresponds to 16 magnetic poles (8 poles per wheel 6, 7) while the stator features 96 slots. Needless to say, this number depends on the applications. For example, it is possible to adopt an arrangement with 12 magnetic poles and 72 slots. In a variant, each pole wheel 6, 7 includes 7 poles.

In FIGS. 2 to 4, each phase includes two windings and one pair of conductor elements 37 is provided per slot 39. Inversion pins are seen at 38, as described in the document WO 92/0657, to which reference should be made for further details, for linking the first winding to a second winding of the same phase. Inversion pins 308 extend axially and circumferentially. They are each installed below an outlet.

Hence, by virtue of the inversion pins 38 at the end of a turn round the stator, another slot is entered so as to rejoin the second winding. In one embodiment, the windings of the same phase are mounted in adjacent slots. In a known way, as regards the coil, each pair of adjacent slot [sic] of the same phase is offset from the pair of adjacent slots following this phase by a number of slots necessary for mounting windings of the other phases. The conductor elements are therefore mounted superimposed in each slot for forming at least one pair of conductor elements mounted superimposed and forming a lower layer or inner layer and an upper layer or outer layer.

A single linking piece 50 is provided for linking the three inlets E1 to E3 and to constitute the neutral point.

The windings of the same phase are mounted in series. In a variant, the windings are mounted in parallel such that six phases are present as can be seen in FIGS. 5 to 7. In these FIGS. 5 to 7 two pairs of electrically conducting elements 37 are provided, shown superimposed in each slot 39' and the alternator of the six-phase type therefore includes, in addition to the phases 20 to 22 constituting a first series of three phases, a second series of three phases 23 to 25 with, in each case respectively, an inlet E'1 to E'3 and an outlet S'1 to S'3. Two series of three inlets and two series of three outlets are therefore provided. The two series of three phases are mounted in parallel in such a way that two rectification devices are provided, for example with diodes. These two devices, in one embodiment, are mounted side-by-side and symmetrically as in the document FR-A-2 687 861.

In this embodiment, the two series of three phases each include a neutral point as can be seen in FIG. 6, such that two linking pieces 50, 51 are provided, each linking together the three inlets of the same series of three phases. The linking pieces 50, 51 are offset circumferentially with respect to one another, being installed on the same circumference of larger diameter than that on which the outlets are installed.

In a variant, one of the series includes windings mounted in delta mode, so that only one single linking piece is provided.

It will be noted that, in FIGS. 2 to 7, the inlets are formed by half-pins each including a straight-line central portion passing axially through a slot 39, 39' and two terminal portions extending on either side of the central part. In FIGS. 2 to 4 the inlets are offset circumferentially with respect to the outlets, while, in FIGS. 5 to 7, the inlets and the outlets are aligned radially. In all cases, the outlets and the inlets belong to a bar passing through the body 14.

Each terminal portion of an inlet includes an inclined part being connected to the central portion and extended by a straight-line free part. These are therefore the free and straight-line parts of axial orientation which are intended to be welded onto the linking piece 50, 51. The inlets belong to branches mounted at the outer periphery of the slots 39, 39'.

FIGS. 8 to 16 show several variants of the arrangement of the linking parts 50, 51.

Figure 8:
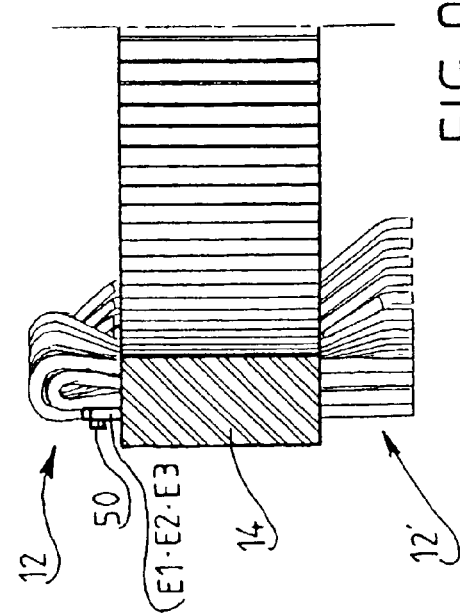
FIG. 8 is a transverse view of an embodiment variant of the linking part according to the invention.
Figure 9:
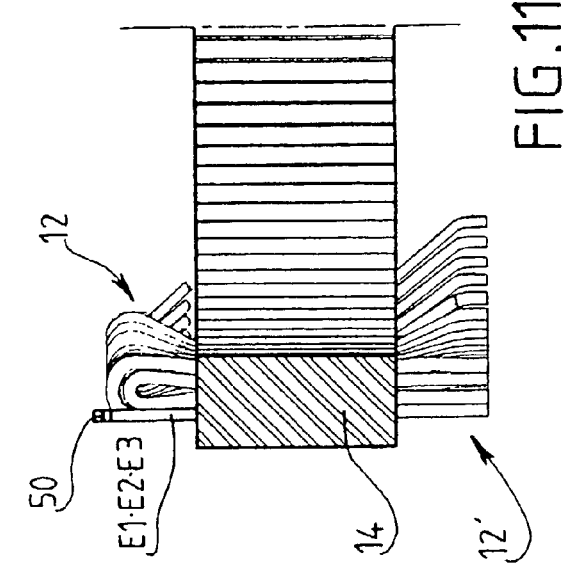
FIG. 9 is a view in transverse section of the stator of FIG. 8.

In the variant represented in FIGS. 8 and 9, the terminal part of the inlets is shorter, such that the electrical resistance is further reduced. Each linking part 50, 51 is formed by a piece in the shape of an annular segment which is welded by its width (on the flat) onto the appropriate lateral face of each terminal part. It results therefrom that the linking piece 50 is adjacent to the axial end in question of the body 14 of the stator.

Figure 10:
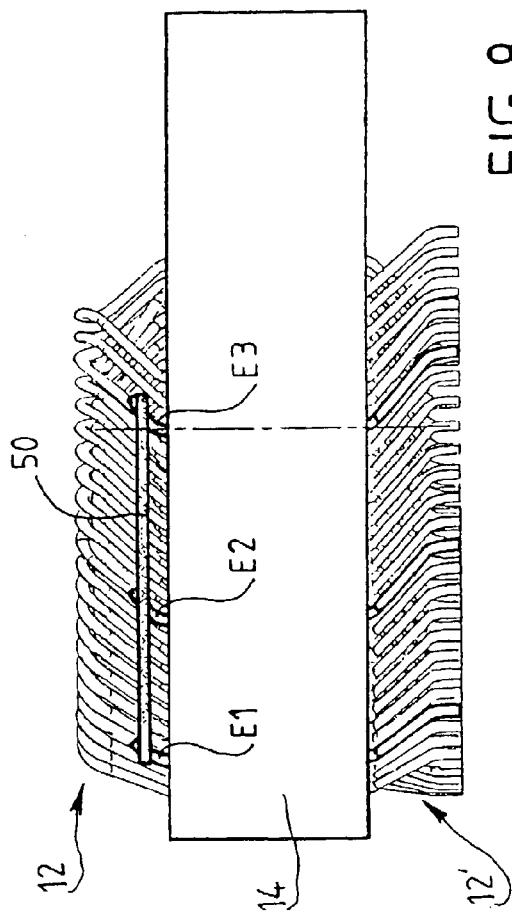
FIG. 10 is a transverse view of another embodiment variant of the linking part according to the invention.
Figure 11:
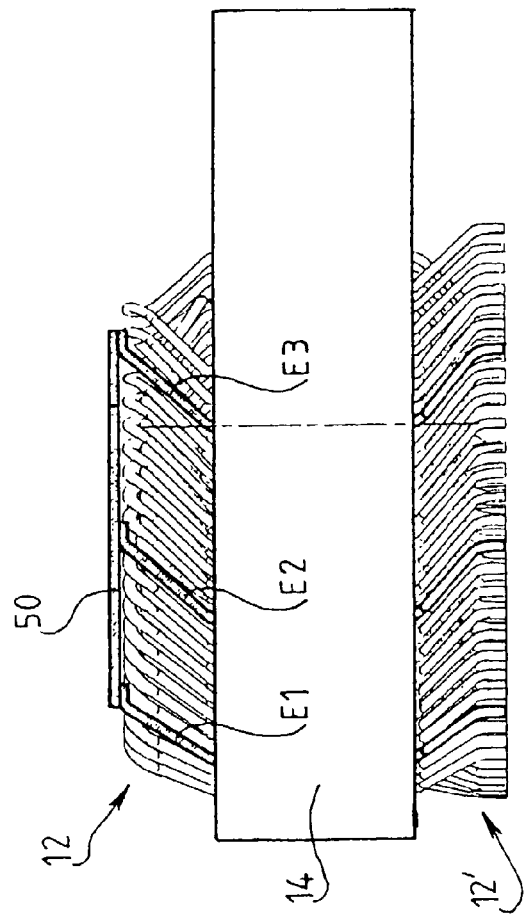
FIG. 11 is a view in transverse section of the stator of FIG. 10.

In the variant represented in FIGS. 10 and 11, the free straight-line ends of each terminal part of the inlets and [sic] are curved over in the circumferential or peripheral direction and constitute claws onto which a linking piece is then welded. It is the thickness of the piece which serves for the welding; the claws increasing the area for welding.

It will be noted that this piece is situated in the region of the vertices of the buns, which separates it from the windings of the phases.

This solution is more bulky axially, but is favourable for ventilation.

Figure 13:
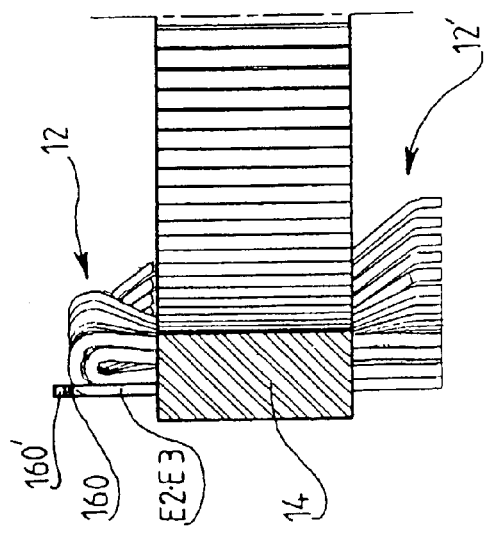
FIG. 13 is a transverse section of the stator of FIG. 12.
Figure 12:
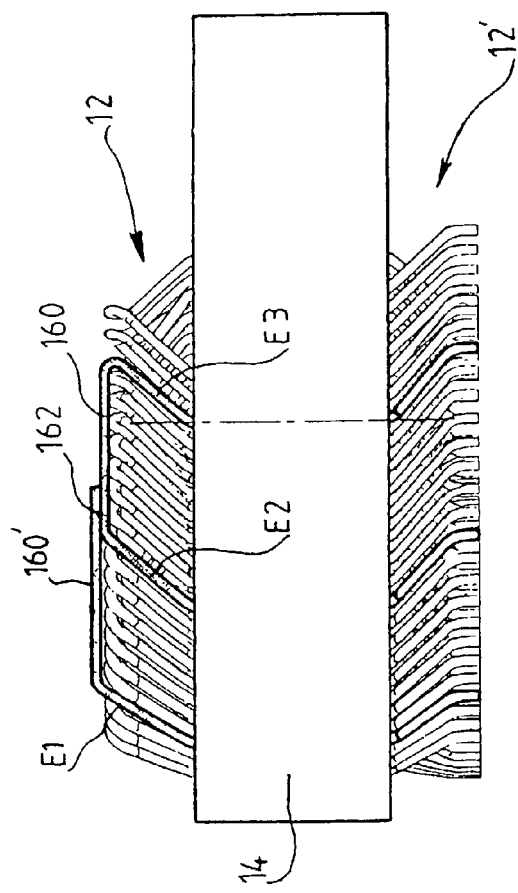
FIG. 12 is a transverse view of another embodiment of the invention.

In the embodiment represented in FIGS. 12 and 13, two first neutral inlets are linked by a pin 160 including a portion extending circumferentially and being in one piece with the inclined portions of two pins forming two inlets E2–E3 which follow each other at the periphery of the bun. The third neutral inlet E1 includes an end portion which is curved over in the circumferential direction. It extends as far as the part 160 so as to be able to be linked to it by a single connecting point produced, for example, in the form of an electron-beam weld 162. The welding is therefore carried out, regarding the rectangular cross-section of the pin 160, in terms of the length of the pin. Hence, it is possible to connect the neutral point with a single weld linking only two specific conductors, thus increasing the reliability of the electrical connection. It is observed that the end portion 160' is welded to the face of the part 160 which is axially outwards.

Figure 14:
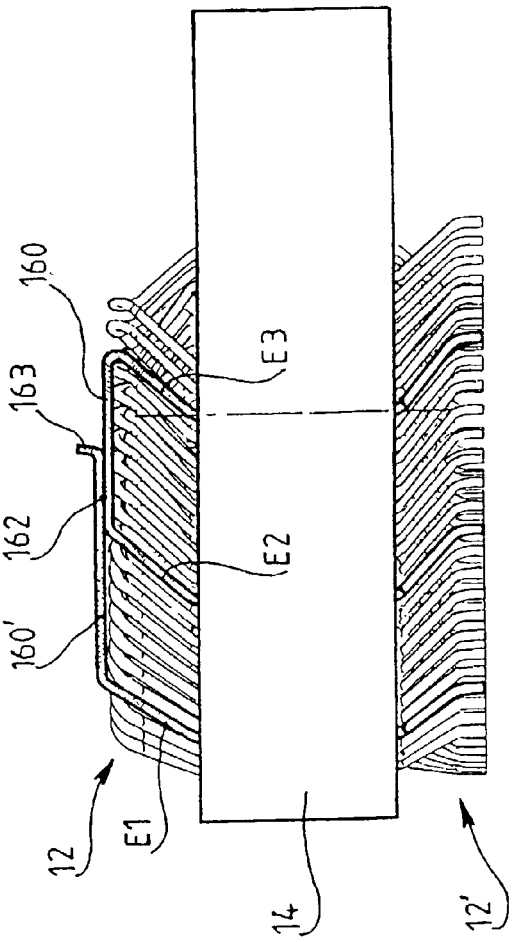
FIG. 14 is a transverse view of a variant of the embodiment of the invention represented in FIG. 13.
Figure 15:
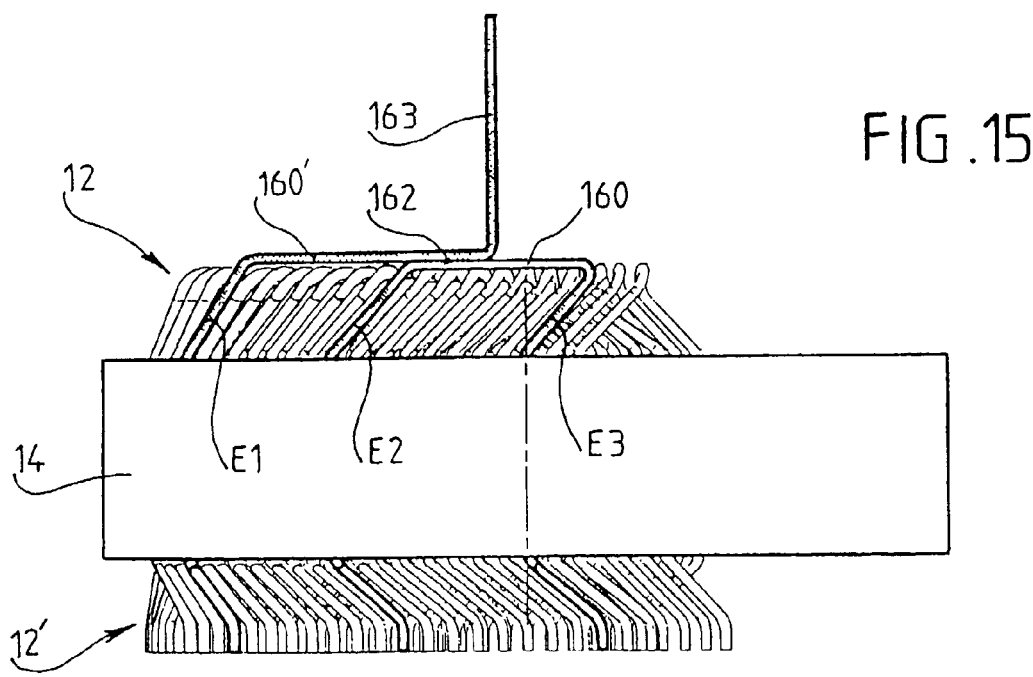
FIG. 15 is a transverse view of another variant of the embodiment of the invention represented in FIG. 13.

In a variant, the portion 160' of the third neutral inlet E1 can be extended beyond the weld point by a free portion of axial orientation 163 of short length, as in FIG. 14, or of long length, as in FIG. 15. This latter arrangement is particularly advantageous for linking the three inlets to the current-rectification device 11.

Figure 16:
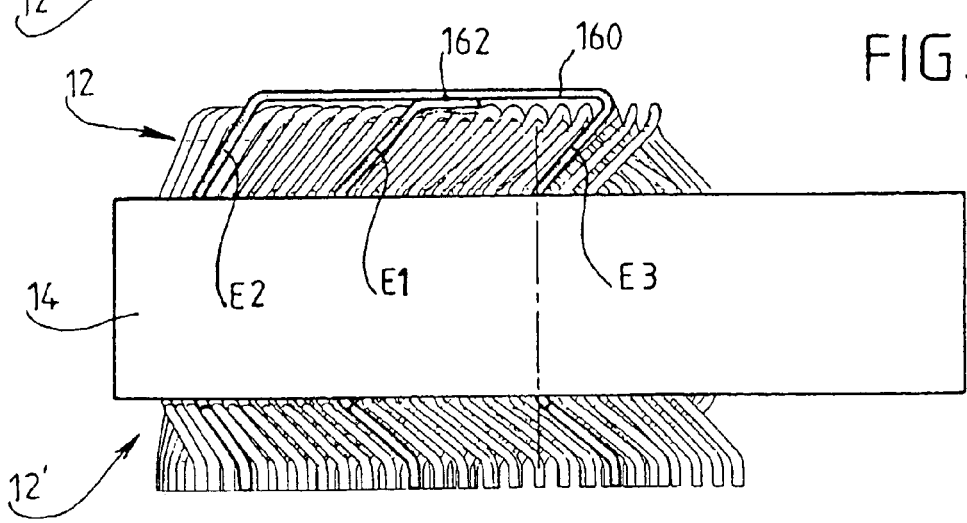
FIG. 16 is a transverse view of another variant of the embodiment of the invention represented in FIG. 13.

In a variant, represented in FIG. 16, the two inlets E2, E3, linked by the peripheral pin portion 160, are not consecutive following the periphery of the bun (12, 12'), the third inlet E1 being interposed between them. The latter, as in FIG. 12, includes a peripheral end portion 160 [sic], connected under the portion 160.

In the variant of FIGS. 12 to 16, in order to constitute a neutral point, two pieces are connected by a weld point.

Figure 17:
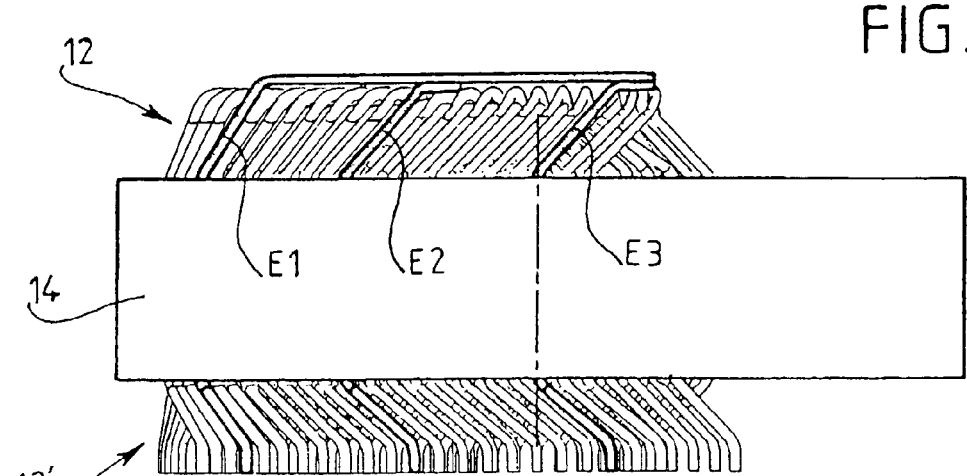
FIG. 17 is a transverse view of another embodiment of the invention.

In another embodiment represented in FIG. 17, the linking part 50, 51 constitutes an extension of a straight-line part of one inlet, here E1, passing axially through a slot 39, 39'. The linking part takes the form of an annular sector of axial orientation to which the two other inlets E2, E3 come to be connected, for example by welding. For that purpose, the end of each inlet E2, E3 is curved over in such a way as to form a fixing claw parallel to the part 50, 51, under the latter in the axial direction of the stator. It should be noted that the part 50, 51 is situated in the region of the vertex of the bun. It is possible, in this way, to connect the neutral point with two welds linking three conductors.

Needless to say, other methods of constituting the neutral may be envisaged, by applying the principle which has just been described. In the same way as for the windings, it is possible to adopt the provisions described in the document FR 01 13553 filed on Oct. 19, 2001 in order to have pin heads of the same length. Hence, four layers of electrically conducting elements are provided per slot in the radial direction as in FIGS. 5 to 7. The two upper layers of a first slot belong to the same upper pair of electrically conducting elements and the other two lower layers to a second lower pair of electrically conducting elements. The upper pair (the upper branches of the pins) is linked by the bottoms of the U-shapes of the pins to a lower pair (the lower branches of the same pins) placed in a second consecutive slot of the same phase. The lower pair of the first slot is linked by the bottom of the U-shapes of the pins to the upper pair placed in a third consecutive slot of the same phase; the second and the third slots being arranged symmetrically on either side of the first slot, being separated from it by a number of slots necessary for the installation of the electrically conducting elements of the other phases.

Needless to say, four electrically conducting elements, in a variant, are mounted in each slots [sic] in pairs as described in the document WO 92/06527 in the above-mentioned way.

Likewise, in a variant, the alternator is an alternator/starter, that is to say a reversible machine constituting an alternator when the pulley is driven by the engine of the motor vehicle, or a starter for driving the engine of the vehicle via the pulley as described, for example, in the document FR-A-2 806 224. In this case, one of the bearings 15, 16 carries at least one sensor, for example of the magnetic type, in order to detect the passing of a magnetic target carried by the rotor.

The rectification bridge is then a rectification and control bridge, which, in one embodiment, is installed outside the reversible alternator. The phase outlets are then linked to a connector carried by the alternator and linked to the rectification and control device via a cable. For further details, refer to this document.

The electric machine according to the invention with a linking part is a high-power, compact, low-noise and well-cooled machine.

The invention claimed is:

1. An alternator for a motor vehicle comprising:
   a stator equipped with a body carrying several phases, each phase comprising,
   an inlet and an outlet installed outside the body of the stator; and
   electrically conducting elements arranged in a network on either side of the body of the stator so as to form a first bun and a second bun, the electrically conducting elements passing through said body, being linked together to form said network, the electrically conducting elements connecting the inlet of each phase to the outlet of each phase by forming at least one winding, wherein one of the buns, on one side of the body of the stator, carries three inlets and a linking part arranged circumferentially, the linking part connected directly to and over each of the three inlets or portion of each of the three inlets thereof and electrically connecting said inlets to one another,
   wherein the linking part is arranged axially between an end of each, respective bun and the body of the stator, a width of the linking part being arranged axially relative to a central axis of the stator.

2. An alternator according to claim 1, wherein the linking part is attached by welding to at least one of said inlets.

3. An alternator according to claim 1, wherein the linking part has an annular-sector shape.

4. An alternator according to claim 3, wherein the linking part is mounted at an outer periphery of said one bun carrying said inlets.

5. An alternator according to claim 2, wherein the linking part is arranged at an axial end of each, respective bun.

6. An alternator according to claim 1, wherein the linking part is a separate linking piece linking the three inlets.

7. An alternator according to claim 6, wherein the inlets each comprise a free part of axial orientation, the linking piece linking these free parts.

8. An alternator according to claim 6, wherein the inlets each comprise a free part of circumferential orientation, the linking piece linking these free parts.

9. An alternator for a motor vehicle comprising:
   a stator equipped with a body carrying several phases, each phase comprising,
   an inlet and an outlet installed outside the body of the stator; and
   electrically conducting elements arranged in a network on either side of the body of the stator so as to form a first bun and a second bun, the electrically conducting elements passing through said body, being linked together to form said network, the electrically conducting elements connecting the inlet of each phase to the outlet of each phase by forming at least one winding, wherein one of the buns, on one side of the body of the stator, carries three inlets and a linking part arranged circumferentially, the linking part electrically connecting said inlets to one another, wherein the linking part is arranged axially between an end of each, respective bun and the body of the stator, wherein two inlets are linked by a pin formed as one piece with the two inlets, the linking part consisting of an end portion of the third inlet curved over in the circumferential direction and being welded onto the pin.

10. An alternator according to claim 9, wherein the linking part is extended by a free portion of axial orientation.

11. An alternator according to claim 1, wherein the linking part constitutes a circumferential extension of one of the three inlets.

12. An alternator according to claim 1, wherein the electrically conducting elements, the inlets, the outlets and the electrical linking part are in the form of bars of square or rectangular cross-section.

13. An alternator according to claim 1, wherein the linking part is produced on the basis of an electrically conducting element.

14. An alternator according to claim 1, wherein the linking part consists of a bar, the bar being pierced in order to facilitate ventilation of its carrying bun.

15. An alternator according to claim 1, wherein two inlets are formed by and linked by a continuous conducting element, the linking part consisting of an end portion of the third inlet, which is curved over in the circumferential direction and welded onto the continuous conducting element.

16. An alternator for a motor vehicle comprising:
a stator equipped with a body carrying several phases, each phase comprising,
an inlet and an outlet installed outside the body of the stator; and
electrically conducting elements arranged in a network on either side of the body of the stator so as to form a first bun and a second bun, the electrically conducting elements passing through said body, being linked together to form said network, the electrically conducting elements connecting the inlet of each phase to the outlet of each phase by forming at least one winding, wherein one of the buns, on one side of the body of the stator, carries three inlets and a linking part arranged circumferentially, the linking part electrically connecting said inlets to one another, and wherein two inlets are linked by a pin formed as one piece with the two inlets, the linking part consisting of an end portion of the third inlet curved over in the circumferential direction and being welded onto the pin,
wherein the linking part is arranged axially between an end of each, respective bun and the body of the stator, a width of the linking part being arranged axially relative to a central axis of the stator.

17. An alternator according to claim 16, wherein the linking part is attached by welding to at least one of said inlets.

18. An alternator according to claim 16, wherein the linking part has an annular-sector shape.

19. An alternator according to claim 16, wherein the linking part is mounted at an outer periphery of said one bun carrying said inlets.

20. An alternator according to claim 16, wherein the linking part is arranged at an axial end of each, respective bun.

21. An alternator according to claim 16, wherein the linking part is extended by a free portion of axial orientation.

22. An alternator according to claim 16, wherein the electrically conducting elements, the inlets, the outlets and the electrical linking part are in the form of bars of square or rectangular cross-section.

23. An alternator according to claim 16, wherein the linking part is produced on the basis of an electrically conducting element.

24. An alternator according to claim 16, wherein the linking part consists of a bar, the bar being pierced in order to facilitate ventilation of its carrying bun.

25. An alternator according to claim 16, wherein two inlets are formed by and linked by a continuous conducting element, the linking part consisting of an end portion of the third inlet, which is curved over in the circumferential direction and welded onto the continuous conducting element.

26. An alternator for a motor vehicle comprising:
a stator equipped with a body carrying several phases, each phase comprising,
an inlet and an outlet installed outside the body of the stator; and
electrically conducting elements arranged in a network on either side of the body of the stator so as to form a first bun and a second bun, the electrically conducting elements passing through said body, being linked together to form said network, the electrically conducting elements connecting the inlet of each phase to the outlet of each phase by forming at least one winding, wherein one of the buns, on one side of the body of the stator, carries three inlets and a linking part arranged circumferentially, the linking part connected directly to and over each of the three inlets or portion of each of the three inlets thereof and electrically connecting said inlets to one another, wherein the linking part is a separate linking piece linking the three inlets to one another,
wherein the linking part is arranged axially between an end of each, respective bun and the body of the stator, a width of the linking part being arranged axially relative to a central axis of the stator.

27. An alternator according to claim 26, wherein the linking part is attached by welding to at least one of said inlets.

28. An alternator according to claim 26, wherein the linking part has an annular-sector shape.

29. An alternator according to claim 26, wherein the linking part is mounted at an outer periphery of said one bun carrying said inlets.

30. An alternator according to claim 26, wherein the linking part is arranged at an axial end of each, respective bun.

31. An alternator according to claim 26, wherein the inlets each comprise a free part of axial orientation, the linking piece linking these free parts.

32. An alternator according to claim 26, wherein the inlets each comprise a free part of circumferential orientation, the linking piece linking these free parts.

33. An alternator according to claim 26, wherein the electrically conducting elements, the inlets, the outlets and the electrical linking part are in the form of bars of square or rectangular cross-section.

34. An alternator according to claim 26, wherein the linking part is produced on the basis of an electrically conducting element.

35. An alternator according to claim 26, wherein the linking part consists of a bar, the bar being pierced in order to facilitate ventilation of its carrying bun.

36. An alternator according to claim 26, wherein two inlets are formed by and linked by a continuous conducting element, the linking part consisting of an end portion of the third inlet, which is curved over in the circumferential direction and welded onto the continuous conducting element.

37. An alternator according to claim 26, wherein the three inlets have substantially identical lengths and substantially identical cross-sections to one another.

38. An alternator for a motor vehicle comprising:

a stator equipped with a body carrying several phases, each phase comprising, an inlet and an outlet installed outside the body of the stator; and electrically conducting elements arranged in a network on either side of the body of the stator so as to form a first bun and a second bun, the electrically conducting elements passing through said body, being linked together to form said network, the electrically conducting elements connecting the inlet of each phase to the outlet of each phase by forming at least one winding, wherein one of the buns, on one side of the body of the stator, carries three inlets and a linking part arranged circumferentially, the linking part connected directly to and over each of the three inlets or portion of each of the three inlets thereof and electrically connecting said inlets to one another, wherein the linking part constitutes a circumferential extension of one of the three inlets, wherein the linking part is arranged axially between an end of each, respective bun and the body of the stator, a width of the linking part being arranged axially relative to a central axis of the stator.

39. An alternator according to claim 38, wherein the linking part is attached by welding to at least one of said inlets.

40. An alternator according to claim 38, wherein the linking part has an annular-sector shape.

41. An alternator according to claim 38, wherein the linking part is mounted at an outer periphery of said one bun carrying said inlets.

42. An alternator according to claim 38, wherein the linking part is arranged at an axial end of each, respective bun.

43. An alternator according to claim 38, wherein the electrically conducting elements, the inlets, the outlets and the electrical linking part are in the form of bars of square or rectangular cross-section.

44. An alternator according to claim 38, wherein the linking part is produced on the basis of an electrically conducting element.

45. An alternator according to claim 38, wherein the linking part consists of a bar, the bar being pierced in order to facilitate ventilation of its carrying bun.

46. An alternator according to claim 38, wherein two inlets are formed by and linked by a continuous conducting element, the linking part consisting of an end portion of the third inlet, which is curved over in the circumferential direction and welded onto the continuous conducting element.

* * * * *